United States Patent [19]

Käser

[11] Patent Number: 5,559,217
[45] Date of Patent: Sep. 24, 1996

[54] DISAZO DYES AND A PROCESS OF DYEING PAPER THEREWITH

[75] Inventor: Adolf Käser, Bottmingen, Switzerland

[73] Assignee: Ciba-Geigy Corporation, Tarrytown, N.Y.

[21] Appl. No.: 538,091

[22] Filed: Oct. 2, 1995

Related U.S. Application Data

[62] Division of Ser. No. 230,264, Apr. 20, 1994, Pat. No. 5,487,761.

[30] Foreign Application Priority Data

Apr. 29, 1993 [CH] Switzerland ............... 1303/93

[51] Int. Cl.$^6$ ................... C09B 31/072; D21H 21/28
[52] U.S. Cl. .................. 534/828; 8/681; 8/929
[58] Field of Search .............. 534/828; 8/919, 8/681

[56] References Cited

U.S. PATENT DOCUMENTS

| | | | |
|---|---|---|---|
| 4,808,192 | 2/1989 | Marita et al. | 8/527 |
| 5,211,719 | 5/1993 | Käser | 8/527 |
| 5,225,545 | 7/1993 | Lauk | 534/829 |
| 5,288,294 | 2/1994 | Käser | 8/687 |

FOREIGN PATENT DOCUMENTS

| | | |
|---|---|---|
| 534903 | 3/1993 | European Pat. Off. . |
| 2051303 | 10/1970 | Germany . |

OTHER PUBLICATIONS

Chem. Abst, 77: 63263 of DE 2,051,303 (1972).
Color Index, The Society of Dyes & Coloureds 3rd Ed. 1971 pp. 2206, 4253.

*Primary Examiner*—Fiona T. Powers
*Attorney, Agent, or Firm*—George R. Dohmann

[57] ABSTRACT

The dyestuffs of the formula

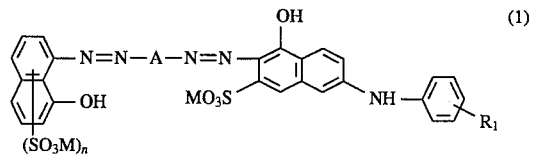

in which A, $R_1$, M and n are as defined in claim 1, are suitable for dyeing paper with good light-fastness.

3 Claims, No Drawings

DISAZO DYES AND A PROCESS OF DYEING PAPER THEREWITH

This is a Divisional of Ser. No. 08/230,264, filed Apr. 20, 1994, now U.S. Pat. No. 5,487,761.

Disazo dyes are often used for dyeing paper in blue colour shades. If high light-fastnesses of the dyeings are desirable, almost exclusively copper complexes of dyes are employed in practice. Light-fast blue dyes for paper which are not copper complexes have recently been sought for economic and ecological reasons. The dyes sought furthermore should display a high degree of exhaustion under the specific dyeing conditions, they should produce dyeings with good wet-fastnesses and they should be so readily soluble that the preparation of liquid commercial forms, i.e. concentrated solutions of these dyes, is possible. These conditions are not yet met in all respects by the blue dyes for paper which are currently obtainable.

The present invention was based on the object of providing a process for dyeing paper in blue colour shades in which the requirements mentioned are met as far as possible. This object is achieved by the process according to the invention.

The invention relates to a process for dyeing paper, which comprises using a dye of the formula

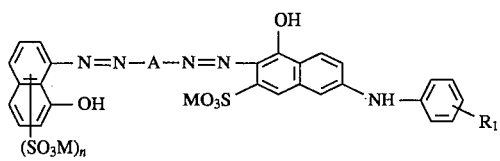

in which
A is a radical of the formula

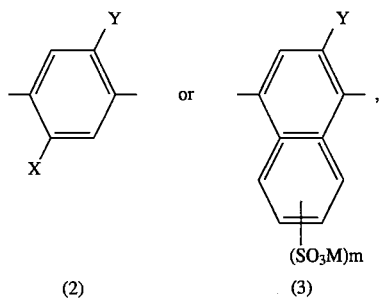

X and Y independently of one another are hydrogen, alkyl, alkoxy or —NH—CO—Z,
Z is hydrogen, alkyl, aryl, alkoxy, amino, mono- or dialkylamino or arylamino,
$R_1$ is hydrogen, alkyl, alkoxy, halogen, $SO_3M$ or carboxyl,
M is hydrogen or one equivalent of a colourless cation,
n is 1 or 2 and
m is 0 or 1.

Alkyl radicals are generally to be understood, according to the invention, as meaning straight-chain, branched or cyclic alkyl groups. Cycloalkyl preferably contains 5 to 8 C atoms and open-chain alkyl preferably contains 1 to 8 C atoms.

Unbranched or branched open-chain alkyl is, for example: methyl, ethyl, n- and iso-propyl, n-, sec- or tert-butyl, n- and iso-pentyl, n- and iso-hexyl or 2-ethylhexyl.

These alkyl radicals can be mono- or polysubstituted, for example by hydroxyl, sulfo, carboxyl, $C_1$–$C_4$alkoxy, hydroxyl-substituted $C_1$–$C_4$alkoxy, phenyl, phenoxy or phenylaminocarbonyl, it being possible for the phenyl group in the last three radicals mentioned to be substituted, for example by sulfo, $C_1$–$C_4$alkyl, $C_1$–$C_4$alkoxy or phenoxy.

Suitable radicals of this type are, for example: hydroxyethyl, 1-hydroxy-isopropyl, ethoxymethyl, 2-hydroxyethoxypentyl, benzyl, 1-phenylethyl, 2-phenylethyl, 1-methyl-2-phenylethyl, 1-iso-butyl-3-phenylpropyl, 1,5-diphenyl-3-pentyl, 1-methyl-2-phenoxyethyl or 1-methyl-2-phenylaminocarbonyl-ethyl.

Cycloalkyl is, in particular, cyclopentyl and cyclohexyl; substituents are, in particular, $C_1$–$C_4$alkyl, especially $CH_3$.

Suitable alkoxy radicals are preferably those having 1 to 4 C atoms, for example methoxy, ethoxy, propoxy, iso-propoxy, n-butoxy, iso-butoxy or tert-butoxy. These alkoxy radicals can be substituted, for example by the radicals mentioned as substituents of the alkyl groups, in particular by hydroxyl or $C_1$–$C_4$alkoxy. Substituted alkoxy radicals are, for example, hydroxyethoxy, methoxyethoxy, 2-hydroxypropoxy, 1,2-dihydroxy-3-propoxy or 1,2-dimethoxy-3-propoxy.

Halogen is to be understood as meaning fluorine, bromine, iodine or, in particular, chlorine.

Aryl radicals in this Application are generally to be understood as meaning aromatic or heteroaromatic radicals, but especially naphthyl or in particular phenyl radicals. All these radicals can be unsubstituted or substituted. Substituents are, for example, $C_1$–$C_4$alkyl, $C_1$–$C_4$alkoxy, bromine, chlorine, nitro, cyano, sulfo, carboxyl or $C_1$–$C_4$alkylcarbonylamino. However, the particularly preferred meaning of aryl is phenyl.

M is hydrogen or one equivalent of a colourless cation, for example lithium, sodium, potassium, ammonium or the protonated form of a $C_4$–$C_{12}$trialkylamine, $C_4$–$C_{12}$diamine or $C_2$–$C_{15}$ alkanol amine.

A protonated $C_4$–$C_{12}$trialkylamine M can be, for example, protonated N-ethyldimethylamine, N,N-diethylmethylamine, tri-n-propylamine, tri-n-butylamine, tri-isobutylamine and, in particular, triethylamine or tri-isopropylamine; mixtures of different protonated amines are also suitable.

A protonated $C_4$–$C_{12}$diamine M is, for example, an ethylenediamine or 1,3-diaminopropane, in which one or both N atoms are additionally substituted by one or two $C_1$–$C_4$alkyl radicals, preferably methyl or ethyl radicals. M here is preferably an N,N-dialkylethylenediamine or N,N-dialkyl-1,3-diaminopropane. Examples are: N-ethylethylenediamine, N,N-dimethylethylenediamine, N,N'-dimethylethylenediamine, N,N-diethylethylenediamine, 3-dimethylamino-1-propylamine or 3-diethylamino-1-propylamine.

A protonated $C_2$–$C_{15}$alkanolamine M can be, for example, the protonated form of a monoalkanol-, dialkanol-, monoalkanolmonoalkyl-, monoalkanoldialkyl-, dialkanolalkyl- or trialkanolamine or a mixture of different protonated alkanolamines. Examples are protonated 2-aminoethanol, di(2-hydroxyethyl)amine, N-(2-hydroxyethyl)dimethylamine, N-(2-hydroyethyl)diethylamine, N,N-di(2-hydroxyethyl)methylamine, N,N-di(2-hydroxyethyl)ethylamine or tri(2-hydroxyethyl)amine, 2-aminoethoxyethanol or diethylaminopropylamine. Protonated polyglycolamines are also possible, for example diethanolamine tris-glycol ether.

M is preferably $Na^{\oplus}$, $Li^{\oplus}$ or a protonated $C_4$–$C_6$alkanolamine, preferred $C_4$–$C_6$alkanolamines being tri(2-hydroxyethyl)amine, di(2-hydroxyethyl)amine or a mixture of these two amines.

Z is preferably $C_1$–$C_4$alkyl, substituted or unsubstituted phenyl, amino or substituted or unsubstituted phenylamino, in particular methyl, phenyl, amino or phenylamino.

X and Y are preferably hydrogen, methyl, methoxy, acetylamino, benzoylamino, ureido or phenylureido, in particular hydrogen, methyl or methoxy.

$R_1$ is, in particular, hydrogen, methyl, methoxy, chlorine, $SO_3M$ or carboxyl, especially hydrogen or $SO_3M$.

A particularly preferred embodiment of the process according to the invention comprises using a dye of the formula

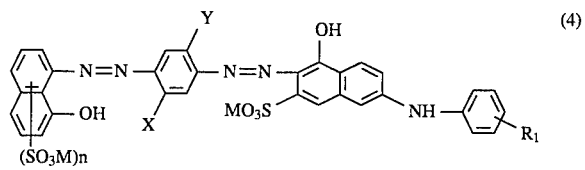
(4)

in which

X and Y independently of one another are hydrogen, methyl, methoxy or —NH—CO—Z,

Z is methyl, phenyl, amino or phenylamino, $R_1$ is hydrogen, methyl, methoxy, chlorine or $SO_3M$, M is hydrogen or one equivalent of a colourless cation and n is 1 or 2.

Among these, particularly preferred dyes are those of the formula

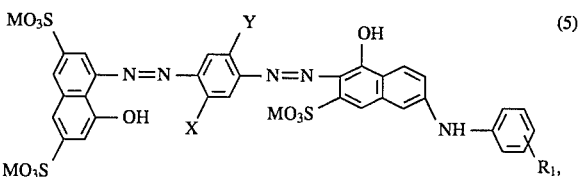
(5)

in which

X and Y independently of one another are hydrogen, methyl or methoxy, $R_1$ is hydrogen or $SO_3M$ and M is hydrogen or one equivalent of a colourless cation.

The dyes of the formula (1) used in the process according to the invention for dyeing paper are known or can be prepared in a manner known per se. However, these dyes have previously been used only for dyeing cotton. Surprisingly, they are particularly suitable for dyeing paper and are particularly distinguished in this context by a good light-fastness of the resulting dyeings.

In recent years, the use of concentrated aqueous solutions of dyes has gained in importance, in particular because of the advantages which such solutions have over dyes in powder form. By using solutions, the difficulties associated with dust formation are avoided and the user is freed from the time-consuming and often difficult dissolving of the dye powder in water. The use of concentrated solutions furthermore has been prompted by the development of continuous dyeing processes for paper, since in these processes it is advantageous to add the solution directly to the Hollander or at any other suitable point of papermaking.

However, difficulties frequently occur when concentrated aqueous solutions of anionic dyes are used, since such solutions are not sufficiently storage-stable and precipitates occur during storage for several months, in particular at about 0° to 5° C.

It has now been found that concentrated aqueous solutions of the dyes used according to the invention have a very good storage stability if they comprise at least 0.1 mol of $Li^{\oplus}$ per mol of dye of the formula (1), the solutions preferably having a pH of at least 11.

The invention therefore also relates to aqueous solutions of dyes, which comprise 2 to 20 per cent by weight of a dye of the formula

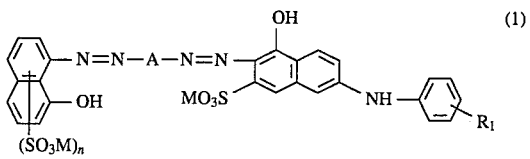
(1)

and at least 0.1 mol of $Li^{\oplus}$ per mol of dye of the formula (1), in which A, M, $R_1$ and n are as defined above under the formula (1).

Among these, those which have a pH of at least 11, preferably between 11 and 13, are preferred.

Preferred aqueous dye solutions comprise 6 to 15 per cent by weight of a dye of the formula (1) and 0.1 to 3 mol of $Li^{\oplus}$ per mol of dye of the formula (1) and have a pH of at least 11.

Those dye solutions which comprise less than 2% by weight, based on the weight of the dye solution, of inorganic salts furthermore are preferred. If the dye solutions are obtained with a higher salt content during synthesis, the solutions can be desalinated in the customary manner, for example by a membrane separation process.

The pH of at least 11 is established in the dye solutions according to the invention by addition of a strong base, for example NaOH, KOH, ammonium, diethanolamine or triethanolamine, but preferably LiOH.

The dye solutions according to the invention can additionally comprise water-soluble organic solubilizing agents, for example urea, ε-caprolactam, dimethyl sulfoxide, N-methylpyrrolidone, water-miscible polyhydric alcohols, such as ethylene glycol, propylene glycol or glycerol, alkanolamines, such as ethanolamine or triethanolamine, or polyglycolamines, for example reaction products of ammonia, as well as alkyl- and hydroxyalkylamines with alkylene oxides, such as ethylene oxide, 1,2-propylene oxide, 1,2-butylene oxide or 2,3-butylene oxide, in suitable quantitative ratios. Such polyglycolamines are known, for example from DE-A-2 061 760.

The concentrated aqueous solutions according to the invention of dyes of the formula (1) can be prepared, for example, by a procedure in which the dye suspension obtained during preparation of the dye is filtered, desalinated, for example by a membrane separation process, if appropriate, and stabilized by addition of a lithium salt and/or lithium hydroxide and if appropriate a solubilizing agent. However, the isolated dye can also be suspended in hydrochloric acid filtered again and the filter cake can be mixed with lithium hydroxide and/or a suitable lithium salt and the required amount of water. Finally, the coupling can also be carried out in the presence of LiOH or alkanolamines and the synthesis solution can then be desalinated.

The aqueous dye solutions according to the invention, which are stable at storage temperatures down to −5° C., are suitable for dyeing paper, on which they produce attractive blue colour shades with high light-fastness with or without the use of a size.

The dye solutions can be used by all the processes customary in the paper industry for direct dyes, in particular for pulp as well as surface dyeing of paper for sized and non-sized grades, starting from bleached or unbleached cellulose of various origins, such as softwood or hardwood sulfite and/or sulfate cellulose.

The present invention furthermore relates to the dyes of the formula

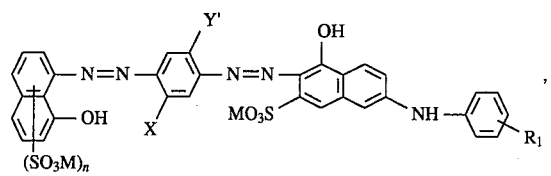

in which

X is hydrogen, alkyl, alkoxy or —NH—CO—Z,

Y' is a $C_1$–$C_4$alkoxy radical, which is substituted by hydroxyl, $C_1$–$C_4$alkoxy, sulfo, carboxyl, phenyl, phenoxy or phenylaminocarbonyl, Z is hydrogen, alkyl, aryl, alkoxy, amino, mono- or dialkylamino or arylamino, $R_1$ is hydrogen, alkyl, alkoxy, halogen, $SO_3M$ or carboxyl, M is hydrogen or one equivalent of a colourless cation, n is 1 or 2 and m is 0 or 1.

X, Z, $R_1$, M, n and m are preferably as defined as preferred in the dyes of the formula (1), and Y' is preferably $C_1$–$C_4$alkoxy which is substituted by hydroxyl or methoxy.

The novel dyes of the formula (6) can be prepared in a manner known per se, for example by diazotization of an aminoazo compound of the formula

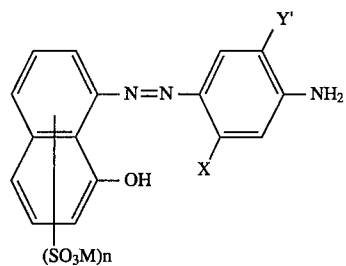

and coupling of the product with a compound of the formula

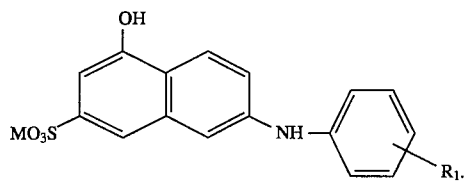

In the compounds of the formulae (7) and (8), X, Y', M, n and $R_1$ are as defined under formula (6).

In the following examples, parts are by weight and temperatures are stated in degrees Celsius.

EXAMPLE 1

60.8 g of the compound of the formula

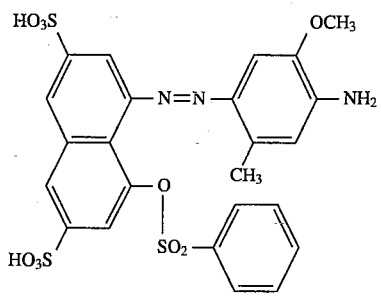

are dissolved with sodium hydroxide solution in 350 ml of water together with 6.9 g of sodium nitrite under neutral conditions and diazotized by addition of 19.2 g of 32% hydrochloric acid at 20° to 25° C. The resulting diazo suspension is added dropwise in the course of 45 minutes, at 25° to 30° C., to a solution prepared from 34.8 g of 6-anilino-1-hydroxynaphthalene-3-sulfonic acid and 22 g of diethanolamine in 250 ml of water;, during this operation, the pH is kept at 8.5 to 9.0 by addition of 18.0 g of diethanolamine. When the coupling has ended, 40 g of 50% sodium hydroxide solution are added to the synthesis solution and hydrolysis is carried out at 75° C. for one hour. After cooling to room temperature, the pH is brought to 6.5 to 7 with 32% hydrochloric acid. A suspension containing the dye of the formula

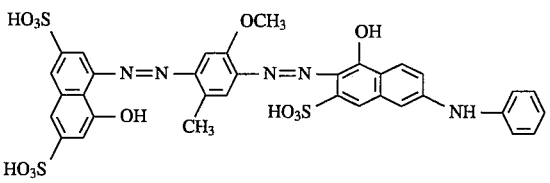

is obtained.

The dye suspension is desalinated by reverse osmosis over a membrane of chemically modified polyacrylonitrile at 50° C. and concentrated to a final weight of 750 g.

A liquid formulation which is storage-stable at 2° to 5° C. for several months is obtained.

EXAMPLE 2

A dye suspension containing 85.9 g of the trisodium salt of the dye described in Example 1 is prepared as described in Example 1, except that 29 g of 30% sodium hydroxide solution are used instead of 40 g of diethanolamine. The resulting suspension is then desalinated by reverse osmosis over a membrane of chemically modified polyacrylonitrile at 50° C. and concentrated to a final weight of 750 g. 3.9 g of $LiOH \cdot 1H_2O$ and 3.9 g of anhydrous $Li_2SO_4$ are added and the solution is stirred at 50° C. for one hour. It is then cooled to 25° C., made up to 780 g with deionized water and filtered.

The resulting dye solution is stable for several months at a storage temperature of 2° to 5° C. and dyes paper with excellent light-fastness.

EXAMPLE 3

The procedure described in Example 1 is repeated, except that 11.7 g of anhydrous $Li_2SO_4$ are used in place of 3.9 g of $LiOH \cdot 1H_2O$ and 3.9 g of anhydrous $Li_2SO_4$, likewise affording a storage-stable liquid formulation.

EXAMPLE 4

The procedure described in Example 1 is repeated, except that a total of 9.9 g of $LiOH \cdot 1H_2O$ is used for the coupling in place of diethanolamine, likewise affording a storage-stable liquid formulation.

EXAMPLE 5

70 parts of chemically bleached sulfite cellulose (from softwood) and 30 parts of chemically bleached sulfite cellulose (from birch wood) are beaten in 2000 parts of water in a Hollander. 2.5 pans of the dye solution described in Example 1 are added to this pulp. After a mixing time of 20 minutes, paper is produced from this pulp. The absorbent paper obtained in this manner is dyed blue. The dyeing has a high light-fastness. The waste water is practically colourless.

EXAMPLE 6

3.0 parts of the dye solution from Example 1 are dissolved in 100 parts of water and the solution is added to 100 pans of chemically bleached sulfite cellulose which has been beaten with 2000 parts of water in a Hollander. After thorough mixing for 15 minutes, sizing is carried out in the customary manner with resin size and aluminium sulfate. Paper produced from this pulp has a blue shade with good wet-fastnesses and good light-fastness.

EXAMPLES 7–13

The following dyes which dye paper in blue colour shades with good fastnesses are prepared in a manner analogous to that described in Example 1.

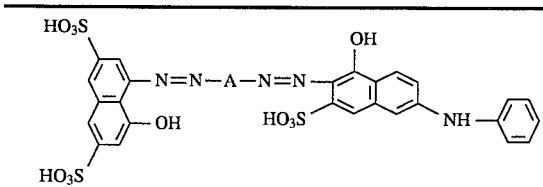

| Example | A |
|---------|---|
| 7 | 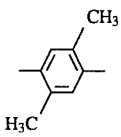 |
| 8 | 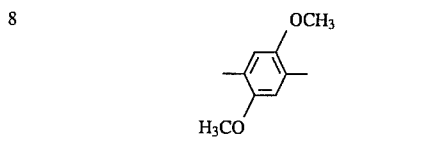 |
| 9 | 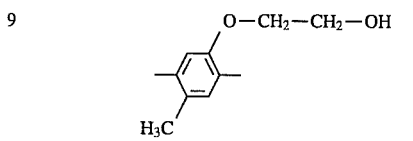 |
| 10 | 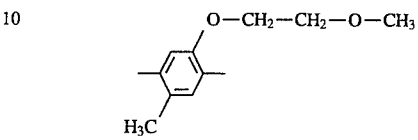 |
| 11 | 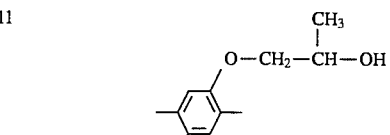 |
| 12 | 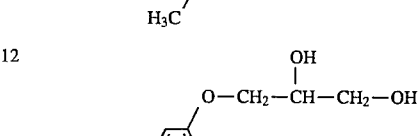 |
| 13 | 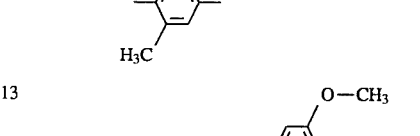 |

EXAMPLES 14–16

The following dyes which dye paper in blue colour shades with good fastnesses are prepared in a manner analogous to that described in Example 1.

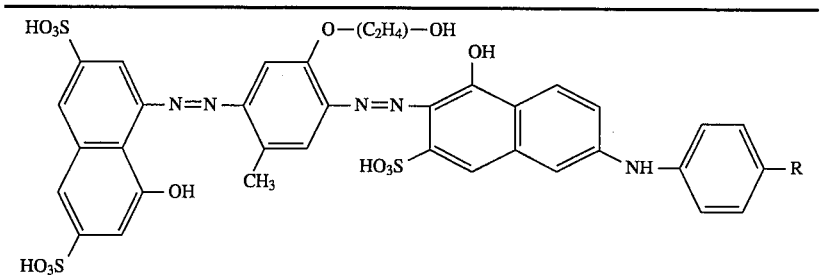
| Example | R |
|---|---|
| 14 | —CH₃ |
| 15 | —SO₃H |
| 16 | —COOH |
EXAMPLES 17–22
The following dyes which dye paper in blue colour shades with good fastnesses are prepared in a manner analogous to that described in Example 1.
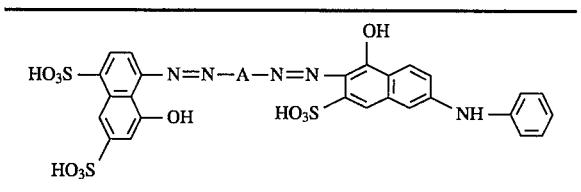
| Beispiel | A |
|---|---|
| 17 | 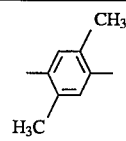 |
| 18 | 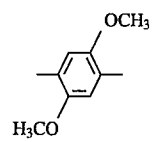 |
| 19 | 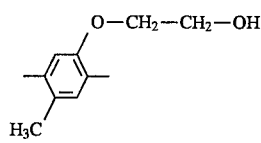 |
| 20 | 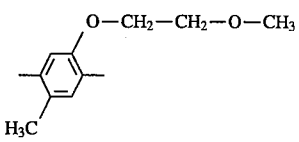 |
| 21 | 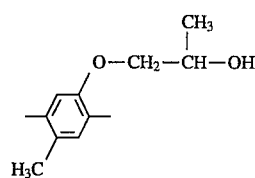 |
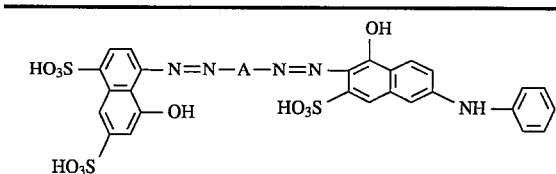
| Beispiel | A |
|---|---|
| 22 | 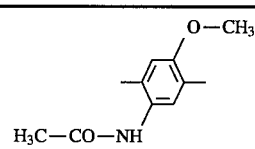 |
EXAMPLES 23–25
The following dyes which dye paper in blue colour shades with good fastnesses are prepared in a manner analogous to that described in Example 1.
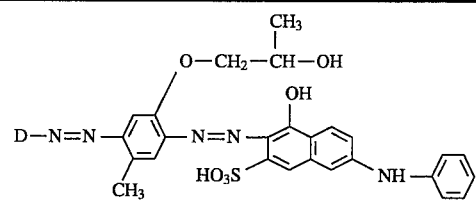
| Example | D |
|---|---|
| 23 | 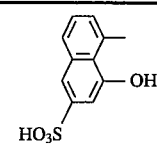 |
| 24 | 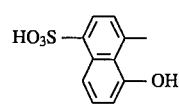 |
| 25 | 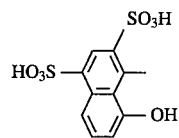 |

What is claimed is:

1. A dye of the formula

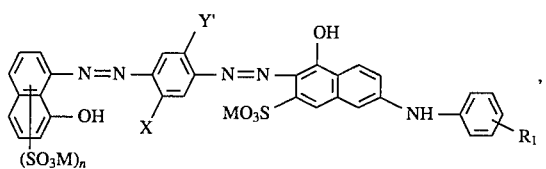 (6)

in which
- X is hydrogen, alkyl, alkoxy or —NH—CO—Z,
- Y' is a $C_1$–$C_4$alkoxy radical, which is substituted by hydroxyl, $C_1$–$C_4$alkoxy, sulfo, carboxyl, phenyl, phenoxy or phenylaminocarbonyl,
- Z is hydrogen, alkyl, aryl, alkoxy, amino, mono- or dialkylamino or arylamino,
- $R_1$ is hydrogen, alkyl, alkoxy, halogen, SO3M or carboxyl,
- M is hydrogen or one equivalent of a colourless cation,
- n is 1 or 2 and
- m is 0 or 1.

2. A dye according to claim 1,
in which
- X is hydrogen, methyl, methoxy or —NH—CO—Z,
- Z is methyl, phenyl, amino or phenylamino,
- Y' is $C_1$–$C_4$alkoxy which is substituted by hydroxyl or methoxy,
- $R_1$ is hydrogen, methyl, methoxy, chlorine or $SO_3M$,
- M is hydrogen or one equivalent of a colourless cation and
- n is 1 or 2.

3. A process for dyeing paper, which comprises applying to the paper or pulp a dye of formula (6)

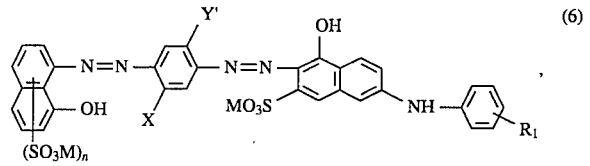 (6)

in which
- X is hydrogen, alkyl, alkoxy or —NH—CO—Z,
- Y' is a $C_1$–$C_4$alkoxy radical, which is substituted by hydroxyl, $C_1$–$C_4$alkoxy, sulfo, carboxyl, phenyl, phenoxy or phenylaminocarbonyl.
- Z is hydrogen, alkyl, aryl, alkoxy, amino, mono- or dialkylamino or arylamino,
- $R_1$ is hydrogen, alkyl, alkoxy, halogen, $SO_3M$ or carboxyl,
- M is hydrogen or one equivalent of a colourless cation,
- n is 1 or 2 and
- m is 0 or 1.

* * * * *